Figure 1:
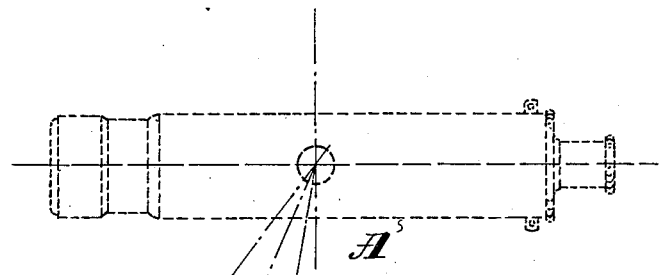

G. EAGLE.
THEODOLITE.
APPLICATION FILED NOV. 25, 1912.

1,095,717.

Patented May 5, 1914.

Witnesses:
Waldo M. Chapin
Ida M. Patterson

Inventor:
George Eagle
by
Rosenbaum & Stockbridge

COLUMBIA PLANOGRAPH CO., WASHINGTON, D. C.

UNITED STATES PATENT OFFICE.

GEORGE EAGLE, OF MANCHESTER, ENGLAND.

THEODOLITE.

1,095,717. Specification of Letters Patent. Patented May 5, 1914.

Application filed November 25, 1912. Serial No. 733,330.

*To all whom it may concern:*

Be it known that I, GEORGE EAGLE, a subject of the King of Great Britain and Ireland, and a resident of Manchester, England, have invented new and useful Improvements in Theodolites, of which the following is a specification.

In transit theodolites as before now constructed it has been possible to obtain a view to the nadir by providing the instrument with a hollow central vertical pivot which could be looked through vertically downward. No view downward, however, below the upper plate, could be obtained through the angle subtended by the upper plate or table of the instrument between its hollow vertical pivot and its circumference, as such part of the plate completely blocked the view.

The object of my present invention is to enable as good a view of ground below the plate to be obtained through such angle as through any other, without interfering with the general efficiency of the instrument or impairing its strength.

In carrying it into effect I form the upper plate with a view hole or series of view holes through it extending from about or near its periphery to the central hollow perforation leading through the central hollow pivot. The object glass of the telescope can be directed along and above this hole or series of holes and through it or them a view can be had. Any necessary parts of the upper plate which cannot be cut completely away from near its periphery to its center are of such small dimensions compared with the diameter of the object glass of the telescope and are at such distances from the periphery and center and from each other as not to block or fill the field of view of the object glass, which perferably is of large diameter. I have found that ribs or the like extending across the view opening or dividing one view opening from another of a width about equal to or even a little more than a quarter of the diameter of the object glass in the telescope do not materially interfere with the view. Any other part of the structure of the instrument, such as the graduated circle, the lower limb, or the base plate or other support for the upper plate and the graduated circle which would come across the view openings in the upper plate as it is manipulated are of a skeleton form, with the ribs, arms, or the like parts which fall in the field of view of such small proportions compared with the size of the object glass as not to interfere with the view.

In a preferred form of instrument any supporting walls, bearings, or the like under the upper plate which are concentric with the vertical pivot and which may come into view through the view openings in such plate, are of a form which, if extended, would radiate from the center around which the telescope has vertical angular movement.

The accompanying drawings illustrate a convenient formation and disposition of upper plate and accessories thereof and supports therefor according to this invention.

Figure 2:
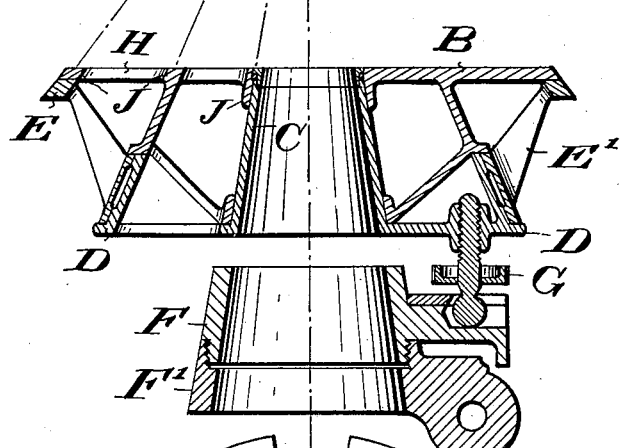
Figure 2:
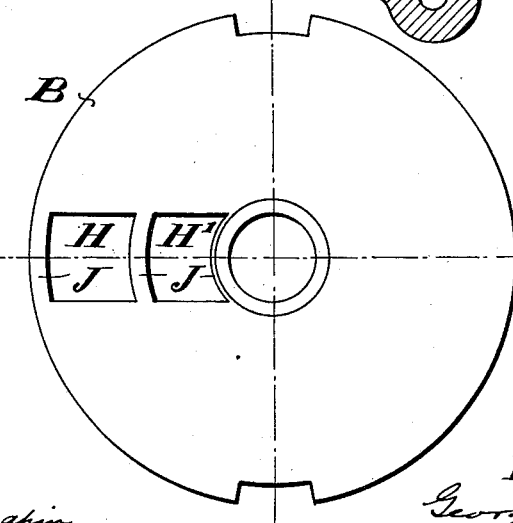

Figure 1 shows the upper plate and its graduated circle and base plate in vertical section along the broken line $x$—$y$ of Fig. 2. Fig. 2 is a plan view of the upper plate.

A is the telescope. It is mounted by trunnions in the usual manner in brackets or standards secured to the upper plate B so that it and the upper plate have angular movement together in a horizontal plane around the vertical hollow pivot C. The supporting brackets or standards for the telescope are not shown in the drawings. The telescope has angular movement in a vertical plane relatively to the plate B as is well known.

D is the base plate or like support which has attached to it or is integral with the pivot C, and supports the upper plate or table B and the graduated circle E in such a manner that each of them is capable of turning movement upon and around it.

$E^1$ is the lower limb.

F is the tribranch which supports the base plate D through three leveling screws, one only of which is illustrated at G. This tribranch is secured to the tripod head which may be of any usual or convenient hollow construction. They are screwed together so that the tribranch F which bears the leveling screws may be detached from the tripod head $F^1$.

The upper table has two holes or view openings H $H^1$ cut through it which permit a free and uninterrupted telescopic view through the plate from its center to its circumference when the object glass of the telescope is directed to and over them. As already explained the ribs or partitions J between the holes H, $H^1$, and between the holes and the opening through the pivot C and the holes and periphery of the plate require to be of small width as compared with the diameter of the object glass of the telescope. The relative sizes illustrated in the drawings are generally convenient and the object glass of the telescope could be directed along the line $x$—$y$ of Fig. 2 and a view be obtained downward through the plate from the periphery to the center of the plate all along such line.

The lower limb is of open skeleton form as is also the base plate and their different parts or members also are of such small dimensions and are sufficiently far apart as not to impede the view through the openings H $H^1$ when these openings are disposed above such members. Those members of the skeleton lower limb, the graduated circle, the base plate, the tribranch and the hollow tripod head, which are concentric to the pivot C, and also the ribs or partitions J are of such form as to radiate from the trunnions of the telescope when seen in section as shown in Fig. 1.

In setting up the instrument for use the tripod is erected in such a manner that its legs or other members which would obstruct the view do not fall into the field of view. The upper plate or table is then set with the line of holes H $H^1$ pointing to and over the point of which a telescopic view is required. The instrument is then used in the customary manner.

It is evident of course that a view opening or view openings may be otherwise formed and disposed in the upper plate than as illustrated in the drawings, and still permit a view to be obtained through such plate from its periphery to its center.

All the usual and necessary accessories and fittings of a transit theodolite other than those shown in the drawings may be employed with a theodolite of my improved construction in the same manner as they are with theodolites of the present usual construction.

What I claim is:—

1. An upper plate of a transit theodolite such plate being provided with a central pivotal perforation and being otherwise perforated between such central perforation and its periphery, the arrangement and disposition of perforations being such that a telescopic view can be obtained through the plate from periphery to center, substantially as set forth.

2. In a transit theodolite, an upper plate rotatable with the telescope formed with a central pivotal perforation and being otherwise perforated between such central perforation and its periphery which perforations permit a telescopic view to be obtained through the plate from periphery to center, and a stationary support for such upper plate also perforated to permit such telescopic view, substantially as hereinbefore set forth.

3. In a transit theodolite, an upper plate rotatable with the telescope formed with a central pivotal perforation and being otherwise perforated between such central perforation and its periphery which perforations permit a telescopic view to be obtained through the plate from periphery to center, a stationary support for such upper plate also perforated to permit such telescopic view, and transverse concentric walls to such perforations, such transverse walls forming parts of conical shells having a common apex in the axis of the telescopic trunnions, substantially as set forth.

4. In a transit theodolite, an upper plate rotatable with the telescope formed with a central pivotal perforation and being otherwise perforated between such central perforation and its periphery which perforations permit a telescopic view to be obtained through the plate from periphery to center, a stationary support for such upper plate also perforated to permit such telescopic view, transverse concentric walls to such perforations such transverse walls forming parts of conical shells having a common apex in the axis of the telescope trunnions, and a hollow tribranch the walls of which form a conical shell also having its apex in the axis of the telescope trunnions, substantially as set forth.

In witness whereof I have hereunto set my hand in the presence of two subscribing witnesses.

GEORGE EAGLE.

Witnesses:
 WILLIAM GEO. HAYS,
 JOHN O'CONNELL.